May 12, 1959     R. SICHO     2,886,783
BALANCING STRUCTURE FOR ELECTRIC INSTRUMENT MOVEMENT
Filed April 29, 1957
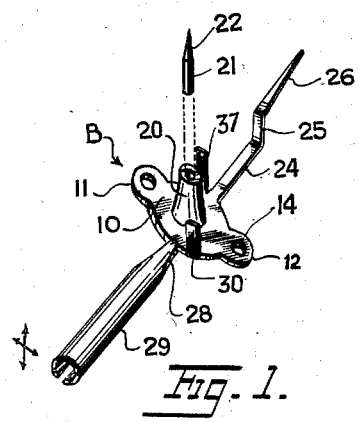
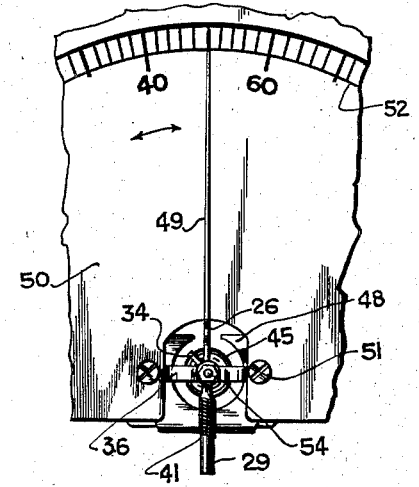
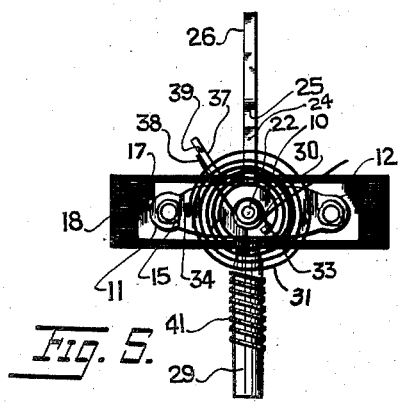
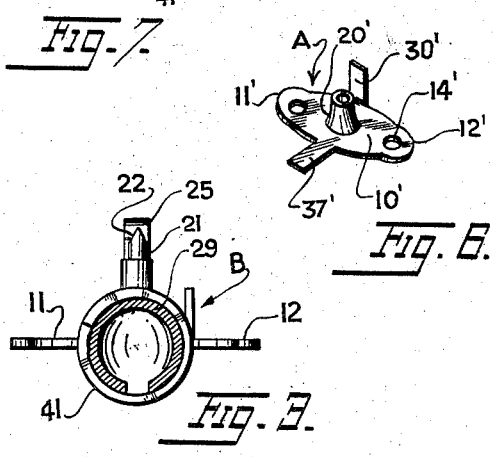
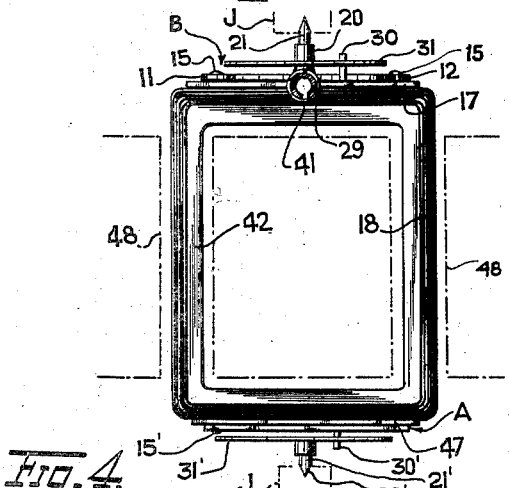
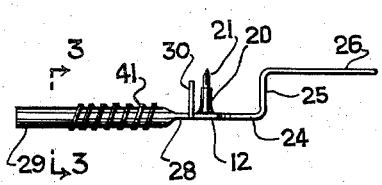
INVENTOR.
ROMAN SICHO
BY
*ATTORNEY*

United States Patent Office 2,886,783
Patented May 12, 1959

2,886,783

BALANCING STRUCTURE FOR ELECTRIC INSTRUMENT MOVEMENT

Roman Sicho, Brooklyn, N.Y.

Application April 29, 1957, Serial No. 655,621

1 Claim. (Cl. 324—155)

This invention relates to pivot mounting and balance structure for electrical instrument movement such as the moving coil with pointer of an ammeter, voltmeter, ohmmeter, etc.

Pivot mounting bases and balance structures heretofore used for pointers of electrical instruments, particularly those of the type disclosed in patent to Simpson 2,433,165, have been characterized by a cruciform structure carrying a plurality of adjustable coil spring weights. The structure is fitted on a spindle of a base member which is attached to a rectangular pivotally supported coil. Upon the spindle are also mounted separate lugs for engaging a coiled hairspring and the rectangular coil leads. A pivot pin is secured in the spindle produced by expensive machinery process. The structure described includes at least eight separate elements which are very small in size. They require very careful assembly which is time-consuming and costly. The several parts tend to work loose on the spindle, causing electrolysis and poor electrical connections, and require frequent readjustment and servicing. No provision is made for adjusting the several weights in any plane other than the common plane of the arms of the cruciform structure and the needle pointer integrally formed therewith.

In the present invention there is provided a simplified structure which can be formed by a high-speed, low-cost stamping operation. The pivot mounting base and balance structure thus formed includes the aforementioned base, balance arm, pointer support, pivot mount, coil hairspring and rectangular coil lead lugs in one integral unit. Thus, the cost of assembly is materially reduced. In addition, the integral formation of the structure insures that the several elements thereof cannot work loose, perform chemical electrolysis, or get out of adjustment.

According to the present invention there is provided a generally cruciform structure having an arm offset from the principal plane of the structure for supporting a pointer. A pair of apertured arms of the structure serve as means for securing the structure to a rectangular moving coil. Another arm of the balance structure is formed as a pliant, channeled, semicylindrical or tubular projection. A fourth arm is joined to the body of the balance structure by a neck section which enables twisting and bending the arm in any of an infinite number of planes to effect proper balance on a pivot. The fourth arm is adapted to support an adjustable weight thereon. The balance structure is so formed that a pivot pin is carried in an extrusion or socket integrally formed on the body of the balance structure. A finger element is also formed on the structure and serves as a lug for soldering of a hairspring thereto. Another lug is formed on the structure and extends therefrom for soldering the leads of the moving coil thereto.

It is therefore a principal object of the invention to provide a pivot mounting base and balance structure for an electrical instrument movement providing in a single integral unit means for supporting a weight, a pivot pin, a pointer, and mounting means for securing the structure to a moving coil.

It is a further object to provide a pivot mounting base and balance structure for an electrical instrument movement including an arm adjustable in an infinite number of planes with respect to a pivot pin and pointer with the arm being adapted to support a weight adjustably thereon.

For further compresension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a pivot mounting base and balance structure according to the invention.

Fig. 2 is a side elevational view of the structure.

Fig. 3 is an enlarged end sectional view of the structure taken on lines 3—3 of Fig. 2.

Fig. 4 is a plan view of the pivot mounting base and balance structure supported on a moving coil of an instrument.

Fig. 5 is an end view of the assembly of Fig. 4.

Fig. 6 is a perspective view of the plate forming the pivot mounting, hairspring and coil lead lugs, the balancing structure and pointer arm being omitted.

Fig. 7 is an elevational view of the pivot mounting base and balance structure mounted in association with an instrument dial and permanent magnet.

Referring to Figs. 1 to 5, inclusive, there is shown a generally cruciform sheet metal unit B having a main central body plate 10. Two short rounded lateral arms 11 and 12 have apertures 14 adapted for receiving adhesive material 15. The adhesive is used to secure the unit to a rectangular block or plate 17 which is mounted on one end of a rectangular coil 18.

Centrally disposed in the body plate 10 at the normal center of gravity of plate 10 is an upstanding extrusion or socket 20 integrally formed on the body. A cylindrical pivot pin 21 having a conical tip 22 is adapted to be removably secured in the extrusion or socket by a press fit. An elongated third lateral arm 24 extends outwardly in the plane of the body plate 10. This arm has an offset section 26 formed by a doubly bent intermediate arm section 25. A fourth lateral arm 29 is disposed in alignment with arm 24. This arm is formed with a constricted portion or neck 28 where the arm joins the body plate 10. Arm 29 is formed as a cylindrical tubular member which can be bent and twisted in an infinite number of planes with respect to arm 24 and the body plate 10, in the directions of the arrows of Fig. 1.

An upstanding lug 30 is formed on the periphery of body plate 10 for securing the inner end of spiral hairsping 31 thereto by solder 33. The outer end of the hairspring is secured to another lug 34 supported on a bracket 36 best shown in Fig. 7. Another lug 37 is formed integrally with plate 10 and coplanar therewith for securing one lead 38 of coil 18 by solder means 39. A helical spring weight 41 is frictionally mounted on arm 29 and is adjustably positionable thereon.

Referring to Fig. 4, it will be noted that the rectangular coil 18 is mounted on a rectangular metal spool 42. A block plate 47 is secured to the coil 18 at the end thereof opposite plate 17. Attached to plate 47 is another pivot mounting base and balance structure A best shown in Fig. 6. This structure has a central body plate 10' similar in form to plate 10. Plate 10' has laterally extending short arms 11' and 12' in which are apertures 14' for securing the structure A to plate 47 by suitable adhesive 15'. An extrusion or socket 20' is centrally disposed on plate 10' for mounting pivot pin 21' therein. Pin 21' has a conical tip 22'. A lug 37' is formed on body 10' for securing the other end of coil 18 thereto. An upstanding lug 30' is integrally formed with plate 10' to engage the inner end of spiral hairspring 31'. The structure A and structure B cooperate in supporting the coil 18 for angular pivotal movement on pins 21, 21'. The pivot pins are supported in jewels J rigidly mounted in the body of the instrument. The jewels are indicated by dot-dash lines in Fig. 4. Coil 18 rotates through a limited angle around a cylindrical soft iron core 45 best shown in Fig. 7. The coil 18 is concealed by bracket 36 shown in Fig. 7. This bracket is secured to the instrument dial 50 by screws 51. Permanent magnet sections 48 are disposed so as to partially surround the path of movement of coil 18. Tubular pointer 49 is secured to arm section 26, by tightly fitting the pointer thereover. This pointer extends up to scale 52 on the dial 50. A screw 54 is used to secure one of the jewels J to the bracket 36. The jewels J are disposed in axial alignment.

The meter or instrument is intended for use with the axis of rotation of the coil 18 disposed in any position, horizontal, vertical or otherwise. The pointer 49 is rotated against the bias of hairsprings 31, 31'. The rotating force is applied electromagnetically by current applied to the coil via hairsprings 31, 31' in a known manner. If the instrument is assumed to be disposed so that dial 50 is located in a vertical plane, it will be apparent that the plane of pointer 49 is offset from the plane of body plate 10.

In order to balance the pointer on the axis of rotation defined by pivot points 22, 22', arm 29 can be bent outwardly from the plane of body plate 10. In addition, weight 41 can be moved frictionally toward the outer free end of arm 29. Because of the pliant neck 28, the arm 29 can be caused to assume any of an infinite variety of positions with respect to body plate 10.

Structures A and B can be formed of any suitable metal such as brass, copper, aluminum or the like. The structures will preferably be silver or cadmium plated. Weight 41 can be a brass or bronze spring. Pivot pins 21, 21' will be formed of steel or other suitable material.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A pivot mounting and balance structure for an electrical instrument movement mechanism, comprising a generally cruciform one-piece structure having a flat central body plate portion, a pair of integral short arms extending laterally from the plate portion and having apertures therein to facilitate securing the structure to a movable coil of the instrument, a pair of integral longer arms extending from the plate portion perpendicularly to the short arms, one of said longer arms having a section offset from the plane of said body plate portion, the other of said longer arms being formed with a constricted section at its juncture with the body plate portion and having an elongated tubular section arranged to be twisted and bent in any of an infinite number of planes with respect to said body plate portion, a socket formed integrally with said body plate portion and projecting upwardly from the center thereof, a pair of integral lugs extending from the periphery of said body plate portion, one of said lugs being arranged to engage one end of a hairspring, the other of said lugs being arranged to engage one end of said coil, a pivot pin mounted in said socket, and a helical weight frictionally retained on the tubular section and adjustably positionable thereon.

References Cited in the file of this patent

UNITED STATES PATENTS

| | | |
|---|---|---|
| 1,166,410 | Cornman | Dec. 28, 1915 |
| 2,429,757 | Hickok | Oct. 28, 1947 |
| 2,575,720 | Lenehan | Nov. 20, 1951 |

FOREIGN PATENTS

| | | |
|---|---|---|
| 21,028 | Great Britain | Sept. 30, 1904 |